US009619986B2

(12) United States Patent
Seol

(10) Patent No.: US 9,619,986 B2
(45) Date of Patent: Apr. 11, 2017

(54) INTELLIGENT INTEGRATED SAFETY MANAGEMENT CONTROL SYSTEM, SERVER, AND METHOD

(71) Applicant: SEJOONGIS CO., LTD., Daegu (KR)

(72) Inventor: Jin Hyun Seol, Daegu (KR)

(73) Assignee: SEJOONGIS CO., LTD. (KR)

( * ) Notice: Subject to any disclaimer, the term of this patent is extended or adjusted under 35 U.S.C. 154(b) by 0 days.

(21) Appl. No.: 14/875,685

(22) Filed: Oct. 5, 2015

(65) Prior Publication Data

US 2016/0110984 A1 Apr. 21, 2016

(30) Foreign Application Priority Data

Oct. 15, 2014 (KR) .......................... 10-2014-0138951

(51) Int. Cl.
| | |
|---|---|
| *G08B 1/08* | (2006.01) |
| *G08B 21/02* | (2006.01) |
| *G06K 7/10* | (2006.01) |
| *H04W 4/00* | (2009.01) |
| *F16P 3/14* | (2006.01) |

(Continued)

(52) U.S. Cl.
CPC ............. *G08B 21/02* (2013.01); *F16P 3/147* (2013.01); *G01S 5/00* (2013.01); *G01S 5/02* (2013.01); *G06K 7/10366* (2013.01); *G06Q 10/00* (2013.01); *G08B 21/14* (2013.01); *H04W 4/008* (2013.01); *G08B 21/043* (2013.01); *G08B 21/0476* (2013.01)

(58) Field of Classification Search
CPC .. G08B 21/02; G08B 21/043; G08B 21/0476; G08B 21/14; G06K 7/10366; G01S 5/00; G01S 5/02; G06Q 10/00; F16P 3/147; H04W 4/008
See application file for complete search history.

(56) References Cited

U.S. PATENT DOCUMENTS

| | | | | |
|---|---|---|---|---|
| 6,232,877 | B1 * | 5/2001 | Ashwin | G06K 17/00 235/384 |
| 6,958,677 | B1 * | 10/2005 | Carter | G06K 17/00 340/10.1 |

(Continued)

*Primary Examiner* — Hai Phan
*Assistant Examiner* — Royit Yu

(57) ABSTRACT

An integrated tag device includes an active tag and transmits a tag signal; a reader device recognizes tag device identification information, generate and transmit a tag device recognition signal, receive a risk notification signal and inform a worker; a worker terminal checks location information thereof, includes the checked location information in a map information request signal, and transmits the map information request signal, receives and displays factory facility map information; an intelligent integrated safety management control server checks reader device identification information and tag device identification information, checks installation location information, tracks a location and predicts a movement path of each moving entity, classifies and stores a movement pattern and a movement path, checks reader device identification information, generates and transmits a risk notification signal, checks worker terminal location information and identification information, checks reader device identification information, reads and transmits factory facility map information to the worker terminal.

10 Claims, 7 Drawing Sheets

(51) Int. Cl.
*G01S 5/00* (2006.01)
*G06Q 10/00* (2012.01)
*G08B 21/14* (2006.01)
*G01S 5/02* (2010.01)
*G08B 21/04* (2006.01)

(56) References Cited

U.S. PATENT DOCUMENTS

| | | | |
|---|---|---|---|
| 7,327,258 B2* | 2/2008 | Fast | G01S 5/0018 340/572.1 |
| 7,412,264 B2* | 8/2008 | Swallow | G08B 13/19621 340/539.12 |
| 8,718,594 B2* | 5/2014 | Braznell | G08B 21/0227 455/3.03 |
| 2011/0037571 A1* | 2/2011 | Johnson, Jr. | G06K 7/0095 340/10.5 |
| 2014/0108507 A1* | 4/2014 | Barker | H01R 13/74 709/203 |

* cited by examiner

INTELLIGENT INTEGRATED SAFETY MANAGEMENT CONTROL SYSTEM, SERVER, AND METHOD

CROSS-REFERENCE TO RELATED APPLICATIONS

This application claims priority under 35 U.S.C. §119 to Korean Patent Application No. 10-2014-0138951, filed on Oct. 15, 2014, the disclosure of which is incorporated herein by reference in its entirety.

TECHNICAL FIELD

The present invention relates to radio frequency identification (RFID) and ubiquitous sensor network (USN)-based intelligent integrated safety management control system, server, and method, and more particularly, to an intelligent integrated safety management control system, server, and method for intelligently controlling integrated safety management of a worker in steel mill.

BACKGROUND

Most safety management control systems generally use portable terminals that generate a risk signal. In a safety management control system, when a user, in the occurrence of a dangerous situation, presses a particular button of a portable terminal, a risk signal is generated, or when an impact occurs or the portable terminal is separated from the user, a risk signal is automatically generated and provided to a rescue organization to come to rescue. In the safety management system, location information is continuously generated such that rescue crew to recognize a movement path to come to rescue, and even when the user is out of a learned movement path, a risk signal is generated to allow rescue crew to automatically come to rescue in an emergency situation. Also, after the user reports a dangerous situation to the rescue organization, the user is allowed to recognize that rescue crew is coming to rescue so that the user may act calmly to cope with the dangerous situation.

Korean Patent Laid Open Publication No. 10-2009-0016922 (published on Feb. 18, 2009) discloses a method for predicting occurrence of danger of a danger management system. In this technique, the method for predicting occurrence of danger of a danger management system includes setting a movement limit section having a predetermined range in a movement path with respect to the current location according to designation of a destination from a user's mobile terminal and checking whether the user moves out of the movement limit section, designating a safety area regarding a movement path peripheral area of the user and checking whether the user moves out of the safety area, setting a movement-available path according to selection frequency of a movement path of each time slot of the same parent population based on users' gender and age and checking whether a user moves out of the movement-available path, setting a movement-available path according to frequency of a movement path of each destination of users and checking whether a user moves away from the movement-available path, generating para-danger alarm when a user moves out of at least any one among the movement limit section, the safety area, and the movement-available path, and releasing the para-danger alarm when safety of the user or a guardian is confirmed in a state in which the para-danger alarm is given and generating danger alarm when safety is not confirmed, whereby a limit of a movement path regarding a predicted path of a user is set, while tracking a user's location, a risk of a corresponding area and a safety area are set, and whether a user moves out of a path is sensed by compositely comparing and evaluating a selection frequency weight of a movement path of the same parent population and users' movement path learning section, thereby predicting whether occurrence of a danger.

Korean Patent Registration No. 10-1079735 (registered on Oct. 28, 2011) discloses an intelligent system for guiding a direction including a plurality of sensing device installed within a building, having discernible sensing IDs, and sensing smoke due to fire, a smoke movement direction, and a temperature to generate sensing information of each sensing ID; a control device indexing each sensing information and location information of each sensing ID corresponding thereto from a location information DB, indexing rescue path information of each sensing ID corresponding to a building drawing and movement distance information of each sensing ID, and performing a shortest distance calculation on the sensing information, the location information of each sensing ID, the rescue path information of each sensing ID, and movement distance information of each sensing ID according to preset risky factor data to generate exit sign guidance information; and a plurality of exit signs installed within the building, including discernible exit sign IDs, and driving a direction indication lamp to output a guidance light toward an exit corresponding to the exit sign guidance information, wherein the control device includes a location information DB storing and managing sensing information, position information of each sensing ID, rescue path information of each sensing ID according to the building drawing, movement distance information of each sensing ID, and exit sign guidance information, a second communication unit receiving sensing information from the sensing device through an information communication network, and transmitting exit sign guidance information to exit sign according to each exit sign ID; and a calculation unit receiving sensing information from the second communication unit, indexing location information of each sensing ID, rescue path information of each sensing ID according to the building drawing, and movement distance information of each sensing ID from the location information DB, and performing a shortest distance calculation according to the preset risky factor data to generate exit sign guidance information. According to the this technique, since the shortest distance guidance system for guiding shelter according to prediction of a flame direction in case of fire, shelter guidance to an exit positioned within the shortest distance from a dangerous area through the exit lamp, and an exit located within the shortest distance on the basis of the risky factor data including concentration data of carbon dioxide included in smoke of fire, wind direction data, wind velocity data, and temperature data through sensing of the sensing device is guided, whereby measures to save people can be strengthened and a firefighting operation can be shortened regardless of location of occupants in case of fire.

In the related art safety management control system, however, since the user is supposed to directly notify about a dangerous situation using a personal portable terminal in most cases only when the dangerous situation is encountered, there is a limitation in preventing a dangerous situation in advance, and even in the dangerous situation, it is difficult for the user to cope with it unless the user directly informs about that. In particular, in an area involving many risky factors such as risky industry (e.g., the steel industry, or the like), many accidents occur frequently over dangerous moving entities in workplaces (factories), causing huge disasters and loss. Nevertheless, there is no technique of predicting and preventing in advance accidents in workplaces (factories), making the working areas exposed to accident defenselessly.

In addition, in the related art safety management control system, locations are tracked through personal portable terminals in most cases, and thus, it is not possible to track precisely, for a long period of time, in indoor and outdoor areas, an object or a person that moves in a wide area without a limitation of time, places, and distances. To this end, an additional location tracking system and a separate communication infrastructure should be established, incurring a great amount of system establishment cost.

RELATED ART DOCUMENT

Korean Patent Laid Open Publication No. 10-2009-0016922
Korean Patent Registration No. 10-1079735

SUMMARY

Accordingly, the present invention provides radio frequency identification (RFID) and ubiquitous sensor network (USN)-based intelligent integrated safety management control system, server, and method for intelligently controlling integrated safety management of a worker in steel mill.

In one general aspect, an intelligent integrated safety management control system includes: a plurality of integrated tag devices configured to each include an active tag attached to a moving entity and transmit a tag signal; a plurality of reader devices configured to recognize tag device identification information from a tag signal received from each tag device when connected to each tag device, to generate a tag device recognition signal including the recognized tag device identification information and transmit the tag device recognition signal, to receive a risk notification signal and inform a worker about a dangerous situation through an alarm warning device unit; a plurality of worker terminals configured to check location information thereof according to a map information request from a worker through an input unit, include the checked location information in a map information request signal, and transmit the map information request signal, and to receive factory facility map information and display a factory facility map to which disaster generation information and risk point information are mapped, through a display unit; and an intelligent integrated safety management control server configured to check reader device identification information and tag device identification information from the tag device recognition signal received from each reader device, to check installation location information corresponding to the checked reader device identification information and determine a location of a moving entity, to track a location of each moving entity by using the determined position information of the moving entity and analyze a movement pattern, to predict a movement path of the moving device according to the analyzed movement pattern, to classify the analyzed movement pattern and the predicted movement path for each object and each worker and store each classified movement pattern and predicted movement path according to the checked tag device identification information, to check reader device identification information corresponding to the current location of the object or the worker when the predicted movement path of the object and the predicted movement path of the worker are the same, to generate a risk notification signal and transmit the generated risk notification signal to a reader device corresponding to the checked reader device identification information, to check worker terminal location information and worker terminal identification information from the map information request signal received from the worker terminal, to check reader device identification information corresponding to the checked worker terminal location information, and to read factory facility map information corresponding to the checked reader device identification information and transmit the read factory facility map information to the worker terminal.

The reader device may transmit a risk notification signal received from the intelligent integrated safety management control server to the integrated tag device.

The integrated tag device may inform a worker about a dangerous situation through an alarm warning device unit according to a risk notification signal received from the reader device.

The integrated tag device may have a gas sensor to sense a generated harmful gas, generate harmful gas sensing information, and transmit the generated harmful gas sensing information to the reader device.

The reader device may include reader device identification information thereof in the harmful gas sensing information received from a corresponding worker terminal and transmit the harmful gas sensing information to the intelligent integrated safety management control server.

The reader device may have a gas sensor to sense a generated harmful gas, generate harmful gas sensing information, and transmit the generated harmful gas sensing information to the intelligent integrated safety management control server.

The intelligent integrated safety management control server may check reader device identification information from the harmful gas sensing information received from the reader device, and read installation location information corresponding to the checked reader device identification information from a database and register the read installation location information as a harmful gas generation area, and when the harmful gas generation area is on a predicted movement path of a worker, the intelligent integrated safety management control server may check reader device identification information corresponding to the current location of the worker from the database, generate a risk notification signal, and transmit the risk notification signal to a reader device corresponding to the checked reader device identification information.

The reader device may include reader device identification information thereof in a map information request signal received from the worker terminal, transmit the map information request signal to the intelligent integrated safety management control server, and subsequently transmit factory facility map information received from the intelligent integrated safety management control server to the worker terminal.

The worker terminal may drive an on-site management application according to a worker request through an input unit to access the intelligent integrated safety management control server, check location information thereof, include the checked location information thereof in a map information request signal, and transmit the map information request signal to the intelligent integrated safety management control server.

The worker terminal may generate an application download request signal, transmit the generated application download request signal to the intelligent integrated safety management control server, download an on-site management application received from the intelligent integrated safety management control server, and subsequently install the on-site management application.

The worker terminal may drive the on-site management application according to a worker request through an input unit to access the reader device, generate a map information request signal including worker terminal identification information thereof, transmit the generated map information request signal to the reader device, and display the factory facility map information received from the reader device through a display unit.

The intelligent integrated safety management control server may store factory facility map information corresponding to each reader device identification information in the database, map disaster generation information and risk point information to factory facility map information, and store the factory facility map information in the database.

The intelligent integrated safety management control server may check reader device identification information from a map information request signal received from the reader device, read factory facility map information corresponding to the checked reader device identification information from the database, and transmit the read factory facility map information to the reader device.

The intelligent integrated safety management control server reads an on-site management application registered in the database according to the application download request signal received from the worker terminal, and transmits the read on-site management application to the worker terminal.

The intelligent integrated safety management control server may check a preset safety management subject by utilizing a worker duty database in association with an enterprise resource planning (ERP) system through a network, check a movement path of the checked safety management subject from the database, monitor the safety management subject through a camera device installed in the checked movement path, analyze a monitoring image through the camera device, and inform an operator or a manager when a value equal to or greater than a preset motion detect change value is sensed.

In another general aspect, an intelligent integrated safety management control server includes: an interface unit configured to transfer a tag device recognition signal or disaster generation information received from a reader device, receive predicted movement path information or disaster generation area, and subsequently register the received predicted movement path information or disaster generation area in a database, to receive a risk notification signal and transmit the received risk notification signal, and to transfer a map information request signal received from a worker terminal, receive factory facility map information, and subsequently transmit the received factory facility map information to the worker terminal; a location tracking unit configured to check reader device identification information and tag device identification information from the tag device recognition signal transferred from the interface unit, to check installation location information corresponding to the checked reader device identification information and determine a location of a moving entity, and to perform location tracking on each moving object using the determined location information of the moving entity and analyze a movement pattern; a movement path predicting unit configured to predict a movement path of a moving entity according to the movement pattern analyzed by the location tracking unit, and to classify the movement pattern analyzed by the location tracking unit and the predicted movement path according to objects and workers and register the classified movement pattern and movement path according to the checked tag device identification information through the interface unit; a risk notification unit configured to, when the predicted movement path of an object registered in the database and the predicted movement path of the worker are the same, check reader device identification information corresponding to the current location of the object or the worker, and to generate a risk notification signal and transmit the generated risk notification signal to a reader device corresponding to the checked reader device identification information through the interface unit; a disaster generation checking unit configured to check reader device identification information from disaster generation information transferred from the interface unit, and to check installation location information corresponding to the checked reader device identification information, and to register the installation location information as a disaster generation area through the interface unit; and a map information providing unit configured to check worker terminal location information and worker terminal identification from a map information request signal transferred from the interface unit, to check reader device identification information corresponding to the checked worker terminal location information, read factory facility map information corresponding to the checked reader device identification information and transfer the read factory facility map information to the interface unit.

The location tracking unit may collect information regarding strength of a tag device recognition signal transferred from the interface unit and determine a location of a moving entity.

The location tracking unit obtain signal strength according to a movement of a moving entity during simulation of a movement path of the moving entity, collect information regarding signal strength, and analyze a degree of scattering regarding the signal strength information, and analyze a degree of scattering regarding the signal strength information to determine an actual location of the moving entity.

The location tracking unit may measure a difference in time required for transmit a signal between the integrated tag device and the reader device, and convert the measured time difference into a distance to estimate a location of a moving entity.

The risk notification unit may compare the movement path of the worker predicted by the movement path predicting unit and the disaster generation area registered by the disaster generation checking unit, and when the disaster generation area is on the predicted movement path of the worker, the risk notification unit may check reader device identification information corresponding to the current location of the worker from the database, generate a risk notification signal, and transmit the generated risk notification signal to a reader device corresponding to the reader device identification information through the interface unit.

The map information providing unit may store factory facility map information corresponding to each reader device identification information in the database, map disaster generation information and risk point information to the factory facility map information, and store the factory facility map information in the database.

The map information providing unit may check reader device identification information from a map information request signal received from the reader device, read factory facility map information corresponding to the checked reader device identification information from the database, and transmit the factory facility map information to the reader device.

The intelligent integrated safety management control server may further include a safety management monitoring unit configured to check a preset safety management subject by utilizing a worker duty database in association with an enterprise resource planning (ERP) system through a network, check a movement path of the checked safety management subject from the database, monitor the safety management subject through a camera device installed in the checked movement path, analyze a monitoring image through the camera device, and inform an operator or a manager when a value equal to or greater than a preset motion detect change value is sensed.

In another general aspect, an intelligent integrated safety management control method includes: recognizing, by a reader device, tag device identification information upon receiving a tag signal from an integrated tag device when the reader device is connected to the integrated tag device for communication, generating a tag device recognition signal including the recognized tag device identification information, and transmitting the generated tag device recognition signal; receiving, by an intelligent integrated safety management control server, the tag device recognition signal, checking reader device identification information and the tag device identification information, checking installation location information corresponding to the checked reader device identification information to determine a location of a moving entity, and tracking a location of each moving entity by using the determined location information of the moving device to analyze a movement pattern; predicting, by the intelligent integrated safety management control server, a movement path of the moving entity according to the analyzed movement pattern, and classifying the analyzed movement pattern and the predicted movement path according to objects or workers, and storing the classified movement pattern and movement path according to checked tag device identification information; when the predicted movement path of an object and the predicted movement path of a worker are the same, checking, by the intelligent integrated safety management control server, reader device identification information corresponding to the current location of the object or the worker, generating a risk notification signal, and transmitting the generated risk notification signal to a reader device corresponding to the reader device identification information; receiving, by the reader device, the risk notification signal, and informing the worker about a dangerous situation through an alarm warning device unit; checking, by a worker terminal, location information thereof according to a map information request from a worker through an input unit, including the checked location information in a map information request signal, and transmitting the map information request signal; receiving, by the intelligent integrated safety management control server, the map information request signal, checking worker terminal location information and worker terminal identification information, checking reader device identification information corresponding to the checked worker terminal location information, reading factory facility map information corresponding to the checked reader device identification information, and transmitting the read factory facility map information; and receiving, by the worker terminal, the factory facility map information, and displaying a factory facility map to which disaster generation information and risk point information are mapped through a display unit.

The analyzing of a movement pattern may include: comparing the determined location information of the moving entity with an actual location of the moving entity, experimenting, testing, and measuring a compensation value for compensating for a location difference, and setting the compensation value in advance, performing location compensation on the determined location information of the moving entity, and determining a location of the moving entity.

The analyzing of a movement pattern may include: receiving the tag device recognition signal, and comparing reader device identification information of reader devices corresponding to three places in which strength of the received tag device recognition signal is strongest with reader device identification information stored in the database; estimating a distance to a moving entity by connecting a path loss of the tag device recognition signal between the integrated tag device and the reader device to a distance by which the tag device recognition signal has moved by utilizing the Friis calculation scheme; calculating a location of the moving entity by using triangulation with respect to the estimated distances to the moving entity; removing noise by applying the Kalman Filter technique to the calculated location of the moving entity; and tracking a location of the moving entity by X and Y coordinate calculation with respect to the noise-removed location of the moving entity.

Other features and aspects will be apparent from the following detailed description, the drawings, and the claims.

DETAILED DESCRIPTION OF EMBODIMENTS

Figure 1:
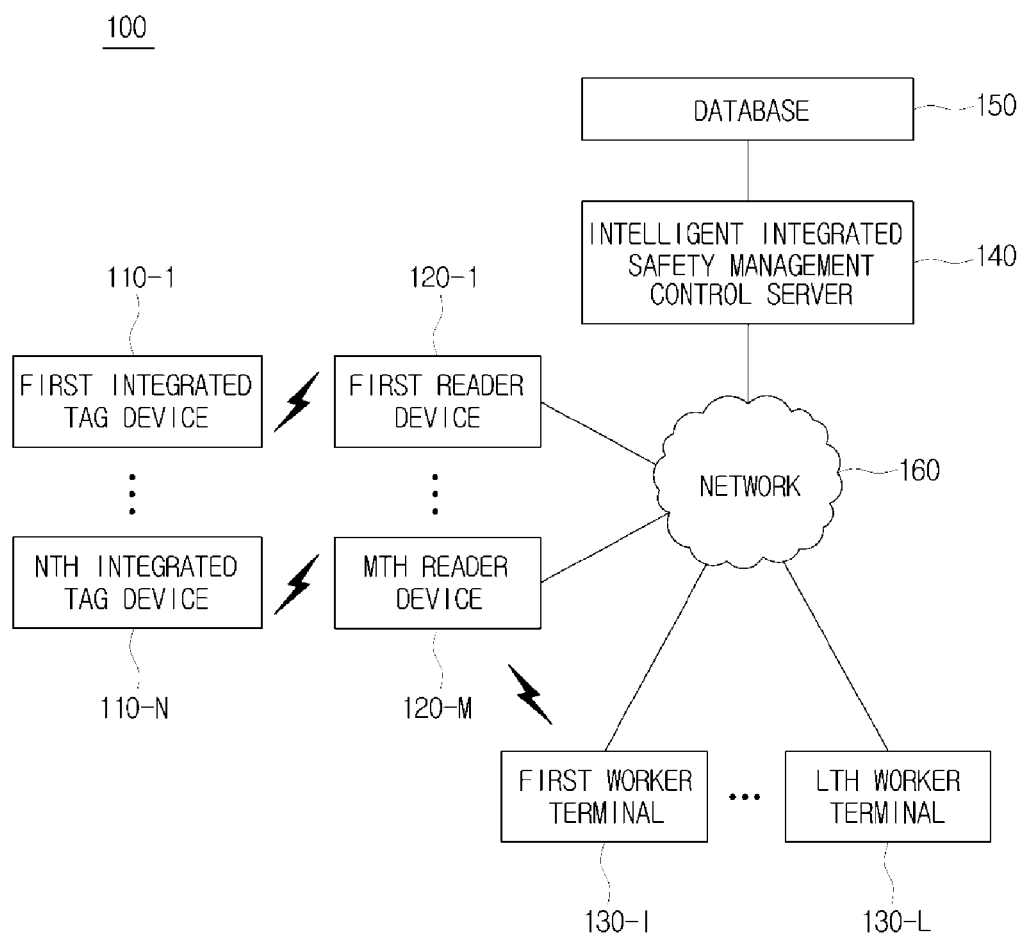
FIG. 1 is a view illustrating an intelligent integrated safety management control system according to an embodiment of the present invention.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~ between", "immediately ~ between" or "adjacent to ~" and "directly adjacent to ~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Hereinafter, an intelligent integrated safety management control system, a server, and a method according to an embodiment of the present invention will be described in detail with reference to the accompanying drawings.

FIG. 1 is a view illustrating an intelligent integrated safety management control system according to an embodiment of the present invention.

Referring to FIG. 1, an intelligent integrated safety management control system 100 includes a plurality of integrated tag devices 110-1 to 110-N, a plurality of reader devices 120-1 to 120-M, a plurality of worker terminals 130-1 to 130-L, an intelligent integrated safety management control server 140, a database 150, and a network 160.

The integrated tag devices 110-1 to 110-N include an active tag (for example, an active radio frequency identification (RFID), etc.) attached to a required object (e.g., a moving device, a harmful material handling place, etc.) or a worker, and has tag device identification information within the active tag. When the integrated tag devices 110-1 to 110-N are connected to the reader devices 120-1 to 120-M for communication through wireless communication, the integrated tag devices 110-1 to 110-N transmit a tag signal to the reader devices 120-1 to 120-M, receive a risk notification signal from the reader devices 120-1 to 120-M, and notifies a worker about a dangerous situation through an alarm warning device unit in advance (warning and alarm).

In an embodiment, the integrated tag devices 110-1 to 110-N include the alarm warning device unit (e.g., a speaker and an LED), and may have, for example, 5 Ghz-Wi-Fi RFID tag, a 125 Mhz proximity RFID (Radio Frequency Identification) tag, or an RFID/USN (Ubiquitous Sensor Network) tag as an egg-type integrated terminal in which RFID, USN, Wi-Fi, or a gas sensor are integrated.

In an embodiment, when a harmful gas is generated, the integrated tag devices 110-1 to 110-N may sense the harmful gas through a gas sensor provided therein, generate a harmful gas sensing information (including tag device identification information thereof), and transmit the generated harmful gas sensing information to the reader devices 120-1 to 120-M.

The reader devices 120-1 to 120-M include, for example, an RF communication module, a Wi-Fi communication module, a Bluetooth™ communication module, a ZigBee™ communication module, and an infrared transmission module. When the reader devices 120-1 to 120-M are connected with the integrated tag devices 110-1 to 110-N for communication, the reader devices 120-1 to 120-M receive a tag signal from the integrated tag devices 110-1 to 110-N, recognize tag device identification information from the received tag signal, generate a tag device recognition signal (including reader device identification information) including the recognized tag device identification information, and transmit the generated tag device recognition signal to the intelligent integrated safety management control server 140 via the network 160 in real time. Also, the reader devices 120-1 to 120-M receive a risk notification signal transmitted from the intelligent integrated safety management control server 140, notify the worker about the dangerous situation through the alarm warning device unit in advance (warning and alarm) or transmit the risk notification signal received from the intelligent integrated safety management control server 140 to the integrated tag devices 110-1 to 110-N connected for communication.

In an embodiment, the reader devices 120-1 to 120-M may have a gas sensor, and when a harmful gas is generated, the reader devices 120-1 to 120-M may sense the harmful gas through the gas sensor, generate harmful gas sensing information (including reader device identification information thereof), and transmit the generated harmful gas sensing information to the intelligent integrated safety management control server 140 through the network 160 in real time.

In an embodiment, the reader devices 120-1 to 120-M may receive map information request signal from the worker terminals 130-1 to 130-L, include reader device identification information thereof in the received map information request signal, and transmit the map information request signal to the intelligent integrated safety management control server 140 through the network 160 in real time.

In an embodiment, the reader devices 120-1 to 120-M may receive the harmful gas sensing information from the worker terminals 130-1 to 130-L, include reader device identification information thereof in the received harmful gas sensing information, and transmit the harmful gas sensing information to the intelligent integrated safety management control server 140 through the network 160 in real time, and thereafter, the reader devices 120-1 to 120-M may receive factory facility map information transmitted from the intelligent integrated safety management control server 140 and transmit the received factory facility map information to the worker terminals 130-1 to 130-L.

The worker terminals 130-1 to 130-L are terminals (e.g., a smartphone, a cellular phone, a personal digital assistant (PDA), a tablet, or a notebook computer) used by workers. The worker terminals 130-1 to 130-L may access the intelligent integrated safety management control server 140 through the network 160, and in this state, when a worker inputs a map information request through an input unit such as a keypad, a touch screen, or a mouse, the worker terminals 130-1 to 130-L may check the map information request, generate a map information request signal for requesting factory facility map information, check location information thereof (e.g., work terminal location information obtained through a GPS or a wireless base station), include the checked work terminal location information and worker terminal identification information in the generated map information request signal, and transmit the map information request signal to the intelligent integrated safety management control server 140. Thereafter, the worker terminals 130-1 to 130-L receive factory facility map information transmitted from the intelligent integrated safety management control server 140 and display a factory facility map to which disaster generation information and risk point information through a display unit such as an LCD or a touch-screen.

In an embodiment, the worker terminals 130-1 to 130-L may have an on-site management application (or an on-site management program) and may access the intelligent integrated safety management control server 140 through the network 160 by driving the on-site management application (or the on-site management program) according to a worker's request through an input unit. Here, the worker terminals 130-1 to 130-L may access the intelligent integrated safety management control server 140, generate an application download request signal for downloading the on-site management application, and transmit the generated application download request signal to the intelligent integrated safety management control server 140 through the network 160, and thereafter, the worker terminals 130-1 to 130-L may download the on-site management application received from the intelligent integrated safety management control server 140 and install the downloaded on-site management application.

In an embodiment, the worker terminals 130-1 to 130-L may access the reader devices 120-1 to 120-M through the on-site management application, and in this state, when a worker inputs a map information request through an input unit, the worker terminals 130-1 to 130-L may check the input map information request, generate a map information request signal, include worker terminal identification information thereof in the generated map information request signal, and transmit the map information request signal to the reader devices 120-1 to 120-M, and thereafter, the worker terminals 130-1 to 130-L may receive factory facility map information transmitted from the reader devices 120-1 to 120-M and display a factory facility map to which disaster generation information and risk point information through a display unit.

The intelligent integrated safety management control server 140 may receive a tag device recognition signal transmitted in real time through the network 160 from the reader devices 120-1 to 120-M, check reader device identification information and tag device identification information from the received tag device recognition signal, read installation location information corresponding to the checked reader device identification information from the database 150 to determine a location of a moving entity, track a location of each moving entity (i.e., an object or a worker) using the determined location information of the moving entity to analyze a movement pattern, predicts a movement path of the moving entity according to the analyzed movement pattern, classify (or distinguish) the analyzed movement pattern and the predicted movement path according to each moving entity (i.e., an object or a worker), register the classified movement pattern and movement path to the database 150 according to each checked tag device identification information, determine whether a predicted movement path of an object and a predicted movement path of the worker are identical, check reader device identification information (i.e., the reader devices 120-1 to 120-M corresponding to the current location of the object and the reader devices 120-1 to 120-M) corresponding to the current location of the worker from the database 150, generate a risk notification information for directly informing the worker about a dangerous situation, and transmit the generated risk notification signal to the reader devices 120-1 to 120-M corresponding to the checked reader device identification information through the network 160.

In an embodiment, the intelligent integrated safety management control server 140 may receive harmful gas sensing information transmitted from the reader devices 120-1 to 120-M through the network 160 in real time, check reader device identification information from the received harmful gas sensing information, read installation location information corresponding to the checked reader device identification information from the database 150 and register the installation location information as a harmful gas generation area in the database 150, determine whether the harmful gas generation area is on a predicted movement path of a worker, check reader device identification information corresponding to the current location of the worker from the database 150, generate a risk notification signal for directly informing the worker about a dangerous situation, and transmit the generated risk notification signal to the reader devices 120-1 to 120-M corresponding to the checked reader device identification information.

In an embodiment, in order to allow for hazard search through augmented reality (AR), the intelligent integrated safety management control server 140 may store factory facility map information (i.e., 3D stereoscopic factory facility map information) corresponding to each reader device identification information in the database 150, and map disaster generation information such as harmful gas generation information and risk point information to corresponding factory facility map information, and store the factory facility map information in the database 150.

In an embodiment, the intelligent integrated safety management control server 140 may receive map information request signal transmitted from the worker terminals 130-1 to 130-L in real time through the network 160, check worker terminal location information and worker terminal identification information from the received map information request signal, check installation location information corresponding to the checked worker terminal location information and reader device identification information corresponding thereto from the database 150, read factory facility map information (i.e., 3D stereoscopic factory facility map information) corresponding to the checked reader device identification information, and transmit the read factory facility map information (including disaster generation information and risk point information) to the worker terminals 130-1 to 130-L through the network 160.

In an embodiment, the intelligent integrated safety management control server 140 may receive a map information request signal transmitted from the reader devices 120-1 to 120-M through the network 160 in real time, check reader device identification information from the received map information request signal, read factory facility map information (i.e., 3D stereoscopic factory facility map information) corresponding to the checked reader device identification information, and transmit the read factory facility map information (including disaster generation information and risk point information) to the reader devices 120-1 to 120-M through the network 160.

In an embodiment, the intelligent integrated safety management control server 140 may receive an application download request signal transmitted from the worker terminals 130-1 to 130-L via the network 160, read an on-site management application registered in the database 150, and transmit the read on-site management application to the worker terminals 130-1 to 130-L.

In an embodiment, the intelligent integrated safety management control server 140, in association with an enterprise resource planning (ERP) system, may check a preset high-risk group worker (i.e., safety management subject) by utilizing worker duty database through the ERP system, check a previously stored ill-health condition worker (i.e., safety management subject) by utilizing health history management database including a physical condition, or the like, of a worker, check a movement path of the checked safety management subject from the database 150, monitor the safety management subject through a camera device (not shown for the purposes of description) installed in the checked movement path in real time, and analyze a monitoring image through the camera device, and if s rapid change (e.g., greater than a preset motion detect change value) in the monitoring image such as occurrence of an accident of the safety management subject or such as sudden collapse of the safety management subject is sensed, the intelligent integrated safety management control server 140 informs an operator or a manager about that, thereby performing intensive safety management on the high-risk group worker or the ill-health condition worker.

The database 150 stores information (e.g., tag device identification information, movement entity name (information such as object name or worker name), a movement entity departure location, a movement entity destination, and a reference movement path) related to the integrated tag devices 110-1 to 110-N according to each tag device identification information (or according to each movement entity name (object name or worker name), stores information (e.g., reader device identification information and installation position) related to the reader devices 120-1 to 120-M according to each reader device identification information, and stores an analyzed movement pattern and a predicted movement path according to each tag device identification information.

In an embodiment, the database 150 may store disaster generation information such as information regarding a harmful gas generation area transferred from the intelligent integrated safety management control server 140, and store information regarding a risk point of each factory facility.

In an embodiment, the database 150 may store map information regarding each factory facility according to each factory facility, and here, the database 150 may store information obtained by mapping disaster generation information and risk point information to corresponding factory facility map information (i.e., 3D stereoscopic factory facility map information) according to each reader device identification information, or may register an on-site management application for monitoring a dangerous article through augmented reality (AR).

The network 160, including a wired communication network or a wireless communication network, connect communication between the plurality of integrated tag devices 110-1 to 110-N and the plurality of reader devices 120-1 to 120-M (for example, USN), communication between the plurality of reader devices 120-1 to 120-M and the intelligent integrated safety management control server 140, and communication between the plurality of worker terminals 130-1 to 130-L and the intelligent integrated safety management control server 140, and allows for data transmission and reception therebetween. Here, USN is a communication network whereby an electronic tag is attached to every required object to recognize an object and an environment and real-time information is established and utilized through the network.

In the intelligent integrated safety management control system 100 having the configuration described above, since safety management of workers in a steel mill based on an RFID and USN between the plurality of integrated tag devices 110-1 to 110-N and the plurality of reader devices 120-1 to 120-M is intelligently controlled as integrated, a workplace (factory) safety accident may be predicted and prevented in advance in an area involving many risky factors such as a risky industry (e.g., the steel industry, or the like), a workplace (factory) safety accident may be promptly coped with, cost for a system establishment may be minimized to establish a safe workplace environment, and an object and a person that moves in a wide area without a limitation of time, places, and distances, may be tracked precisely for a long period of time in indoor and outdoor areas.

Figure 2:
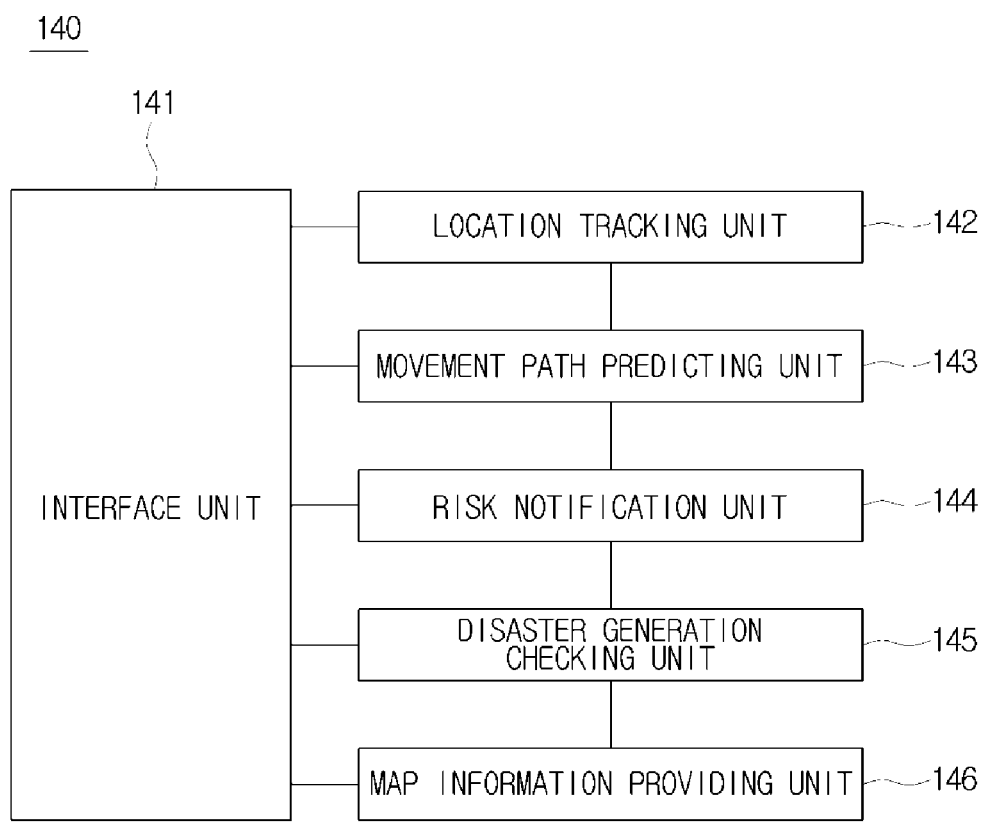
FIG. 2 is a block diagram illustrating the intelligent integrated safety management control system of FIG. 1.

FIG. 2 is a block diagram illustrating the intelligent integrated safety management control system of FIG. 1.

Referring to FIG. 2, the intelligent integrated safety management control server 140 includes an interface unit 141, a location tracking unit 142, a movement path predicting unit 143, a risk notification unit 144, a disaster generation checking unit 145, and a map information providing unit 146. Here, the intelligent integrated safety management control server 140 establishes a middleware-software interworking platform (i.e., integrated real time location system (RTLS) management platform), and here, the intelligent integrated safety management control server 140 may establish an RTLS application manager, a data filtering and log system, a device interworking interface module, and a Web server environment.

The interface unit 141 interworks with the plurality of reader devices 120-1 to 120-M (or the plurality of worker terminals 130-1 to 130-L) through the network 160 to transmit and receive data.

Here, the interface unit 141 receives a tag device recognition signal transmitted from the reader devices 120-1 to 120-M through the network 160 in real time, transfers the received tag device recognition signal to the location tracking unit 142, receives information regarding a predicted movement path form the movement path predicting unit 143 and registers the received information regarding a predicted movement in the database 150, transmits a risk notification signal transferred from the risk notification unit 144 to the reader devices 120-1 to 120-M checked by the risk notification unit 144 through the network 160, receives disaster generation information (e.g., harmful gas sensing information) transmitted from the reader devices 120-1 to 120-M through the network 160 in real time and transfers the received disaster generation information to the disaster generation checking unit 145, receives information regarding a disaster generation area (e.g., a harmful gas generation area) from the disaster generation checking unit 145 and registers the received information regarding a disaster generation area in the database 150, transmits a risk notification signal transferred from the risk notification unit 144 to the reader devices 120-1 to 120-M checked by the risk notification unit 144 through the network 160, receives map information request signal transmitted from the worker terminals 130-1 to 130-L through the network 160 in real time and transfers the received map information request signal to the map information providing unit 146, and subsequently transmits factory facility map information (including disaster generation information and risk point information) transferred from the map information providing unit 146 to the worker terminals 130-1 to 130-L through the network 160.

The location tracking unit 142 checks reader device identification information and tag device identification information from a tag device recognition signal transferred from the interface unit 141, reads installation location information corresponding to the checked reader device identification information from the database 150 and determines a location of a moving entity, performs location tracking of each moving entity (i.e., an object or a worker) on the determined location information of the moving entity by using the location information and analyzes a movement pattern, and transfers information regarding the analyzed movement pattern movement path to the movement path predicting unit 143.

In an embodiment, the location tracking unit 142 may determine a location of a moving entity by collecting information regarding strength of a tag device recognition signal transferred from the interface unit 141. That is, the location tracking unit 142 may obtain signal strength (i.e., strength of the tag device recognition signal) according to a movement of the moving entity in a movement path simulation of the moving entity, and determine an actual location of the moving entity by collecting information regarding the signal strength (i.e., received signal strength indication (RSSI) signal) and analyzing a degree of scattering regarding the signal strength information.

In an embodiment, the location tracking unit 142 may measure a difference in time for transmitting a signal between the integrated tag devices 110-1 to 110-N and the reader devices 120-1 to 120-M using a distance measurement scheme using a time difference of arrival (TDOA), converts the measured time difference into a distance to track a location of a moving entity. Here, the location tracking unit 142 may calculate a location of the moving entity by using points at which a difference in signal transmission time between the integrated tag devices 110-1 to 110-N and the reader devices 120-1 to 120-M is uniform. Also, the location tracking unit 142 may calculate a location of a worker by using triangulation.

In an embodiment, in order to minimize a temporal error to occur in a multipath, the location tracking unit 142 may select the strongest signal among multipath signals by using the distance measurement scheme using TDOA and additionally combining RSSI thereto to reinforce the strongest signal, and subsequently determine a location of a worker.

The movement path predicting unit 143 predicts a movement path of a moving entity according to information regarding a movement pattern movement path transferred from the location tracking unit 142, classifies (or distinguishes) the analyzed movement pattern and predicted movement path according to each movement entity (i.e., an object or a worker), registers information regarding the movement pattern and the predicted movement path of the object and information regarding the movement pattern and the predicted movement path of the worker in the database 150 through the interface unit 141 according to each of the checked tag device identification information, and transfers the predicted movement path of the object and the predicted movement path of the worker to the risk notification unit 144.

The risk notification unit 144 compares the predicted movement path of the object and the predicted movement path of the worker transferred from the movement path predicting unit 143, determines whether the predicted movement path of the object and the predicted movement path of the worker are identical according to the comparison result, checks the reader devices 120-1 to 120-M corresponding to the current location of the object and the reader devices 120-1 to 120-M corresponding to the current location of the worker from the database 150, generates a risk notification signal for directly informing the worker about a dangerous situation, transfers the generated risk notification signal to the interface unit 141, compares the predicted movement of the worker transferred from the movement path predicting unit 143 and information regarding a disaster generation area transferred from the disaster generation checking unit 145, determines whether the disaster generation area (e.g., a harmful gas generation area) is on the predicted movement path of the worker according to the comparison result to check the reader devices 120-1 to 120-M corresponding to the current location of the worker from the database 150, generates a risk notification signal for directly indicating the worker about a dangerous situation, and transfers the generated risk notification signal to the interface unit 141.

The disaster generation checking unit 145 checks reader device identification information from the disaster generation information (e.g., harmful gas sensing information) transferred from the interface unit 141, reads installation location information corresponding to the checked reader device identification information from the database 150, registers the read installation location information as a disaster generation area (e.g., a harmful gas generation area) in the database 150 through the interface unit 14, and transfers information regarding the disaster generation area to the risk notification unit 144 (or the map information providing unit 146).

In order to allow for hazard search through augmented reality, the map information providing unit 146 stores factory facility map information (i.e., 3D stereoscopic factory facility map information) corresponding to each reader device identification information in the database 150 through the interface unit 141, maps risk point information previously set by a manager or an operator or information regarding a disaster generation area transferred from the disaster generation checking unit 145 to the corresponding factory facility map information and stores the factory facility map information in the database 150 through the interface unit 141, and thereafter, the map information providing unit 146 checks worker terminal location information and worker terminal identification information from the map information request signal transferred from the interface unit 141, checks installation location information corresponding to the checked worker terminal location information and reader device identification information corresponding thereto from the database 150 through the interface unit 141, reads factory facility map information (i.e., 3D stereoscopic factory facility map information) corresponding to the checked reader device identification information from the database 150 through the interface unit 141, and transfers the read factory facility map information (disaster generation information and risk point information) to the interface unit 141.

In an embodiment, when the map information providing unit 146 receives map information request signal transmitted from the reader devices 120-1 to 120-M through the interface unit 141 in real time, the map information providing unit 146 may check reader device identification information from the received map information request signal, read factory facility map information (i.e., 3D stereoscopic factory facility map information) corresponding to the checked reader device identification information from the database 150, and transmit the read factory facility map information (including disaster generation information and risk point information) to the reader devices 120-1 to 120-M through the interface unit 141.

The intelligent integrated safety management control server 140 having the configuration described above further includes an on-site management application management unit (not shown for the purposes of description). The on-site management application management unit may receive an application download request signal transmitted from the worker terminals 130-1 to 130-L, read an on-site management application registered in the database 150, and transmit the read on-site management application to the worker terminals 130-1 to 130-L through the interface unit 141.

The intelligent integrated safety management control server 140 having the configuration described above further includes a safety management monitoring unit (not shown for the purposes of description). The safety management monitoring unit, in association with an enterprise resource planning (ERP) system through the interface unit 141, may check a preset high-risk group worker (i.e., safety management subject) by utilizing worker duty database through the ERP system, check a previously stored ill-health condition worker (i.e., safety management subject) by utilizing health history management database including a physical condition, or the like, of a worker, check a movement path of the checked safety management subject from the database 150, monitor the safety management subject through a camera device (not shown for the purposes of description) installed in the checked movement path in real time, and analyze a monitoring image through the camera device, and if s rapid change (e.g., greater than a change value of pre-set motion detect) in the monitoring image such as occurrence of an accident of the safety management subject or such as sudden collapse of the safety management subject is sensed, the safety management monitoring unit informs an operator or a manager about that.

Figure 3:
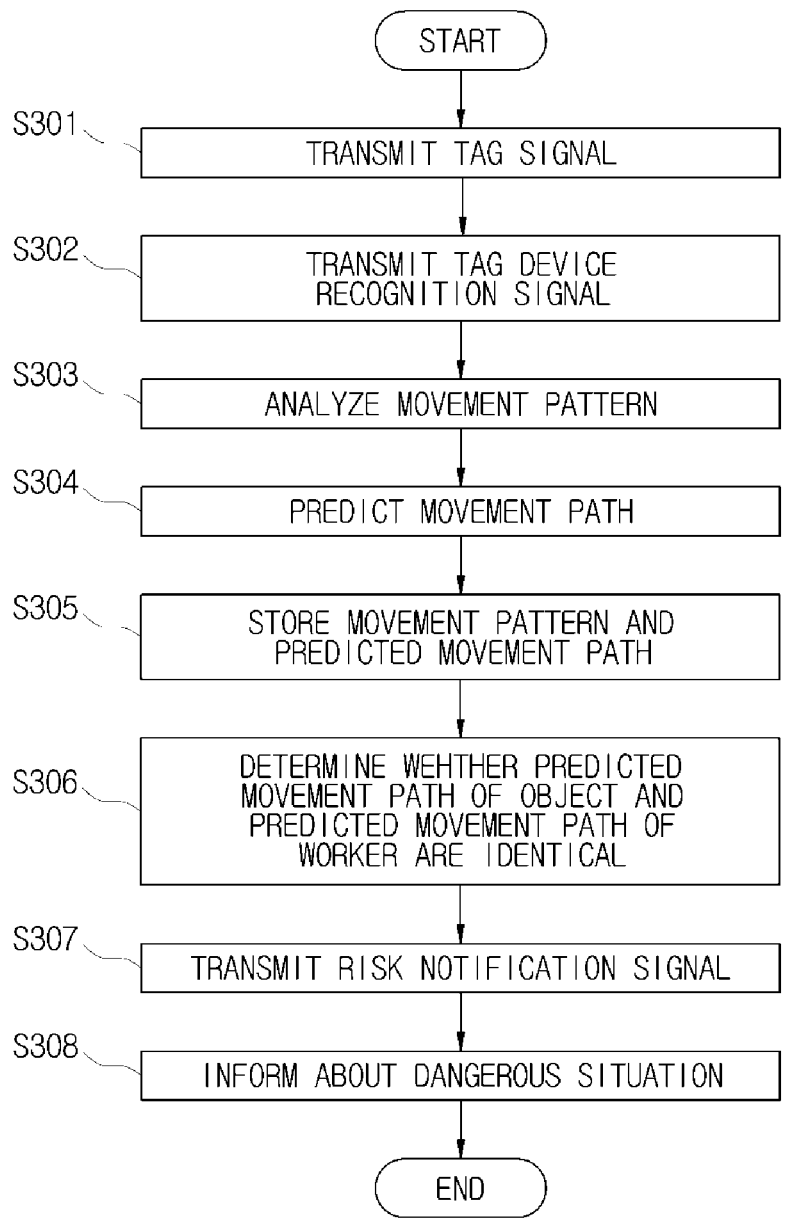
FIG. 3 is a flow chart illustrating an intelligent integrated safety management control method according to an embodiment of the present invention.
Figure 4:
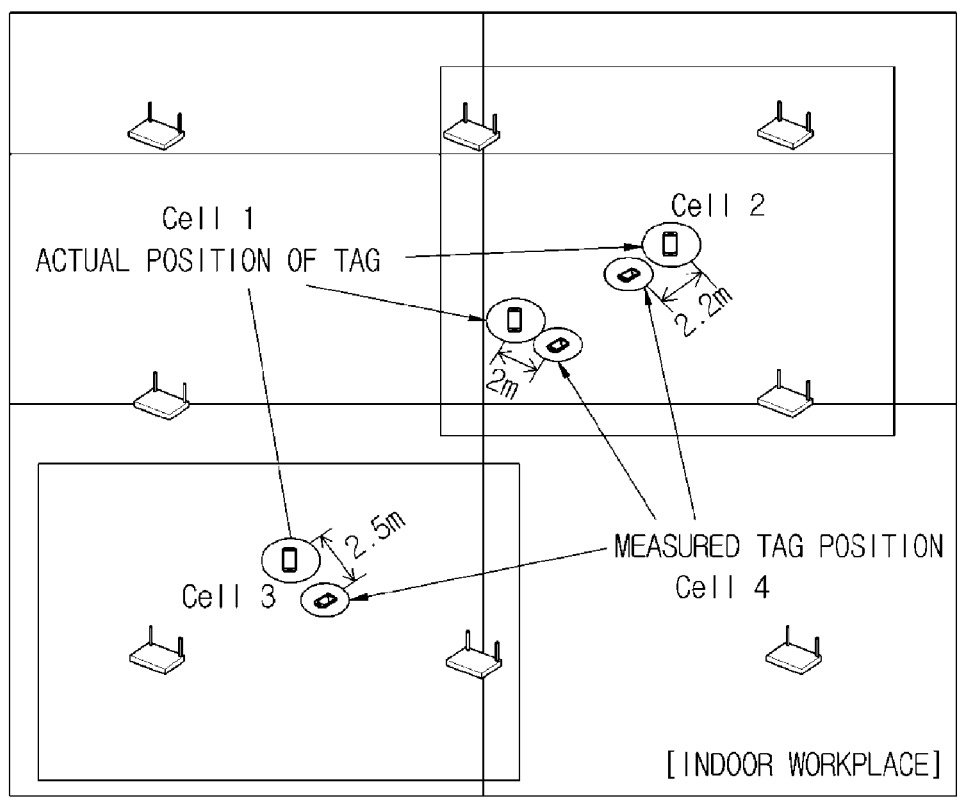
FIG. 4 is a view illustrating determining of a position of a moving entity in FIG. 3.
Figure 5:
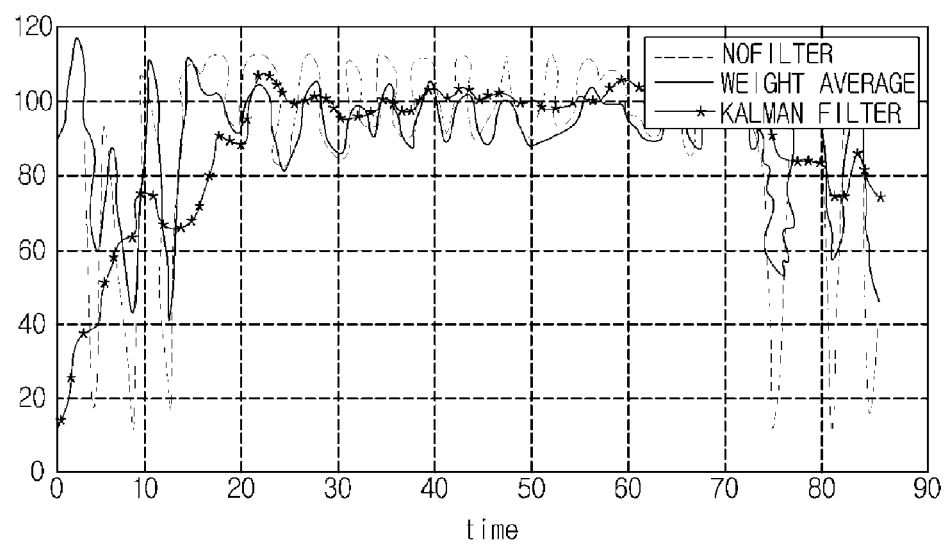
FIG. 5 is a graph illustrating tracking a position of a moving entity in FIG. 3.
Figure 6:
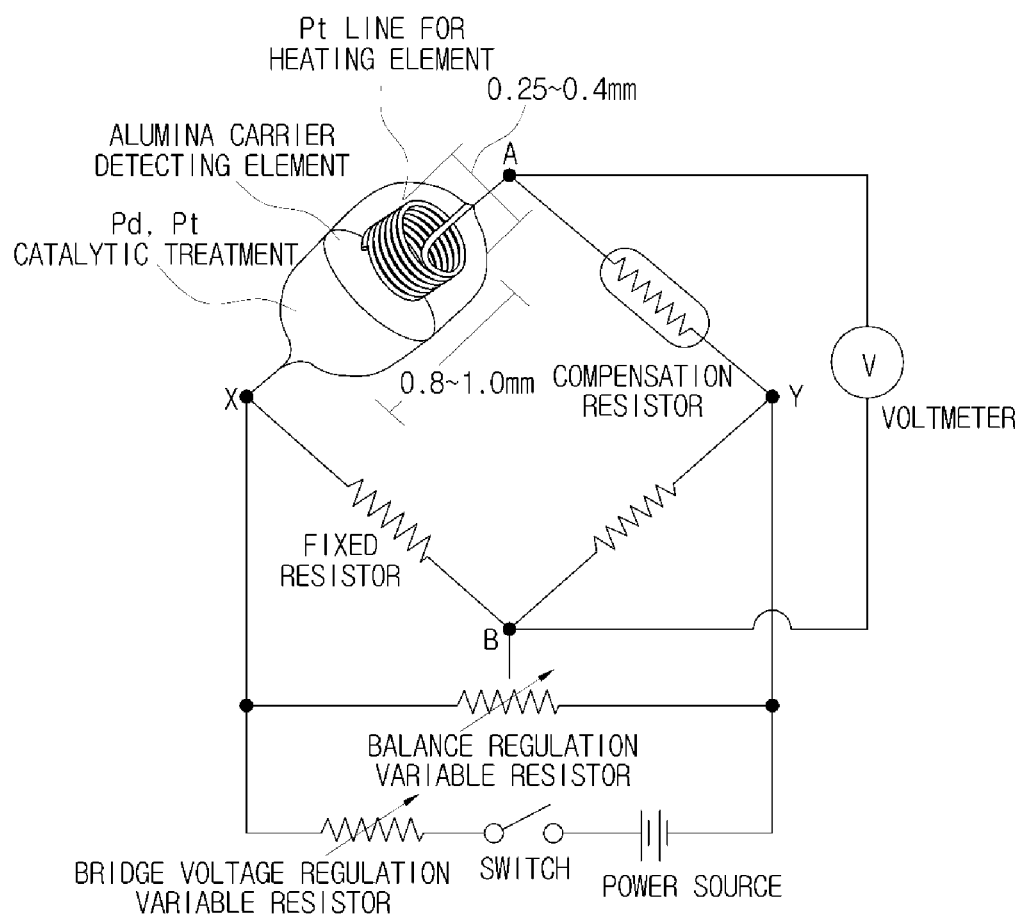
FIG. 6 is a view illustrating sensing a harmful gas in FIG. 3.
Figure 7:
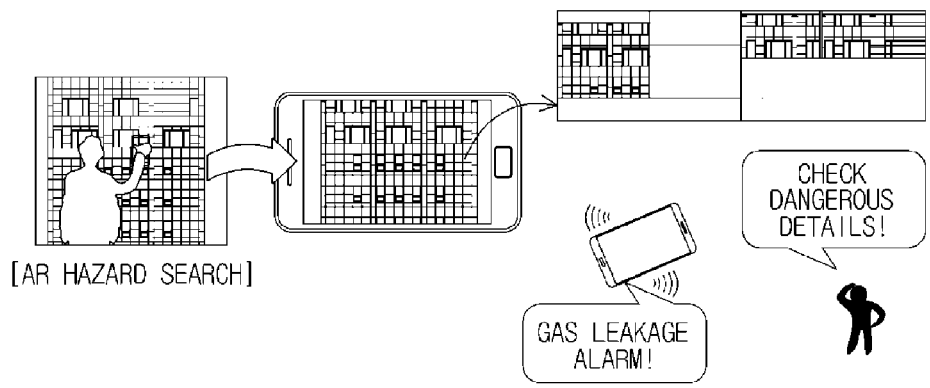
FIG. 7 is a view illustrating notifying about a dangerous situation in FIG. 3.
Figure 8:
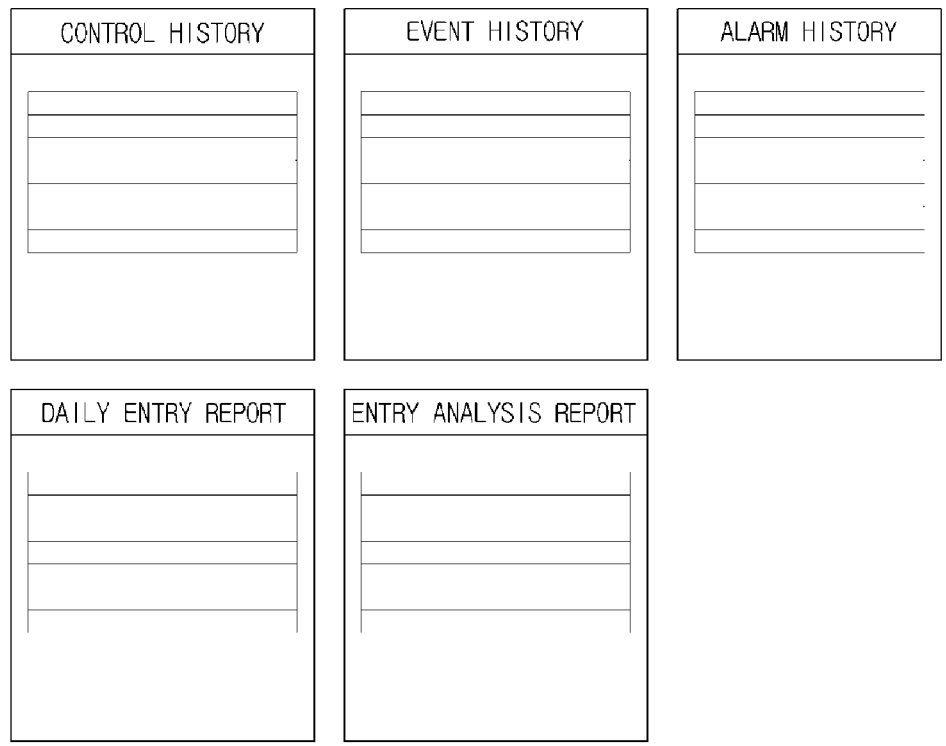
FIG. 8 is a view illustrating worker monitoring management of intelligent integrated safety management control server in FIG. 3.

FIG. 3 is a flow chart illustrating an intelligent integrated safety management control method according to an embodiment of the present invention, FIG. 4 is a view illustrating determining of a position of a moving entity in FIG. 3, FIG. 5 is a graph illustrating tracking a position of a moving entity in FIG. 3, FIG. 6 is a view illustrating sensing a harmful gas in FIG. 3, FIG. 7 is a view illustrating notifying about a dangerous situation in FIG. 3, and FIG. 8 is a view illustrating operator monitoring management of intelligent integrated safety management control server in FIG. 3.

Referring to FIGS. 3 through 8, when the integrated tag devices 110-1 to 110-N, which has an active tag (e.g., an active RFID, etc.) attached to a moving entity (e.g., a moving device, a harmful material handling place, or a worker) and has tag device identification information included in the active tag, is connected to the reader devices 120-1 to 120-M for communication throughwireless communication, the integrated tag devices 110-1 to 110-N transmit a tag signal (including the tag device identification information) to the reader devices 120-1 to 120-M in step S301.

When the tag signal is transmitted in step S301, the reader devices 120-1 to 120-M, when connected to the integrated tag devices 110-1 to 110-N for communication through wireless communication, receive the tag signal from the integrated tag devices 110-1 to 110-N, recognize tag device identification information from the received tag signal, generate tag device recognition signal (including reader device identification information) including the recognized tag device identification information, and transmit the generated tag device recognition signal to the intelligent integrated safety management control server 140 through the network 160 in real time in step S302.

When the tag device recognition signal is transmitted in step S302, the intelligent integrated safety management control server 140 receives a tag device recognition signal transmitted from the reader devices 120-1 to 120-M through the network 160 in real time, checks reader device identification information and tag device identification information from the received tag device recognition signal, reads installation location information corresponding to the checked reader device identification information from the database 150 and determines a location of the moving device, tracks a location of each moving entity (i.e., an object or a worker) by using the determined location information of the moving device, and analyzes a movement pattern in step S303.

Here, the intelligent integrated safety management control server 140 may set a compensation value for compensating for the difference in locations by comparing the location information of the moving entity determined in step S303 with an actual location of the moving entity, in advance through experiment, testing, and measurement, and after performing compensation on the location information of the moving entity determined in step S303 with the preset compensation value as shown in FIG. 4, the intelligent integrated safety management control server 140 may subsequently determine a location of the moving entity.

In step S303, the intelligent integrated safety management control server 140 may receive an RSSI signal transmitted from the reader devices 120-1 to 120-M through the network 160 in real time, compare reader device identification information (e.g., a MAC address) of the reader devices 120-1 to 120-M corresponding to three places in which the received RSSI signals are strongest, with leader device identification information stored in the database 150, and estimate a distance to the moving entity by utilizing the Friis calculation scheme, and estimate a distance to the moving entity by utilizing the Friis calculation scheme. Here, the distance to the moving entity is estimated by measuring strength (i.e., RSSI signal) of the tag device recognition signal received by the reader devices 120-1 to 120-M from the integrated tag devices 110-1 to 110-N, and here, a path loss of the tag device recognition signal between the integrated tag devices 110-1 to 110-N and the reader devices 120-1 to 120-M may be estimated by associating it with the distance by which the tag device recognition signal has moved, and also, a relationship between the path loss of the RSSI signal and the distance may be obtained by the Friis calculation formula $$\left( P_r = P_t \frac{G_t G_r \lambda^2}{(4\pi d)^2} = P_t \frac{A_{i,t} A_{i,r}}{d^2 \lambda^2} \right).$$

Thereafter, the intelligent integrated safety management control server 140 may calculate a location of the moving entity by using triangulation with respect to the distances to the moving object estimated as described above, and here, for the calculated location of the moving entity, the intelligent integrated safety management control server 140 may remove noise by applying a Kalman Filter technique as illustrated in FIG. 5, and thereafter, the intelligent integrated safety management control server 140 may track a location of the moving entity by X, Y coordinates calculation with respect to the noise-removed location of the moving entity.

After the movement pattern is analyzed in step S303, the intelligent integrated safety management control server 140 predicts a movement path of the moving entity according to the movement pattern analyzed in step S303, in step S304.

After predicting the movement path in step S304, the intelligent integrated safety management control server 140 classifies (or distinguishes) the movement pattern analyzed in step S303 and the movement path predicted in step S304 for each movement entity (i.e., object or worker), and store (i.e., register) the classified information regarding the movement pattern and the information regarding the predicted movement path for each tag device identification information checked in step S303 in the database 150 in step S305.

After the information regarding the movement pattern and the movement path is registered in step S305, the intelligent integrated safety management control server 140 reads the registered information regarding the predicted movement path of the object and the information regarding the predicted movement path of the worker from the database 150, and determines whether the predicted movement path of the object and the predicted movement path of the worker are the same in step S306.

When the predicted movement path of the object and the predicted movement path of the worker are the same, the intelligent integrated safety management control server 140 checks the reader devices 120-1 to 120-M corresponding to the current location of the object and the reader devices 120-1 to 120-M corresponding to the current location of the worker from the database 150, generates a risk notification signal for directly informing the worker about a dangerous situation, and transmit the generated risk notification signal to the checked reader devices 120-1 to 120-M through the network 160 in step S307.

When a harmful gas is generated in step S307, the integrated tag devices 110-1 to 110-N may sense a harmful gas through a gas sensor provided therein, generate harmful gas sensing information (including tag device identification information thereof), and transmit the generated harmful gas sensing information to the reader devices 120-1 to 120-M. Upon receiving the harmful gas sensing information from the worker terminals 130-1 to 130-L, the reader devices 120-1 to 120-M may include reader device identification information thereof in the received harmful gas sensing information and transmit the harmful gas sensing information to the intelligent integrated safety management control server 140 through the network 160.

As illustrated in FIG. 6, the gas sensor is formed in the form of a bridge circuit, and here, the AX side and the AY side are configured with elements having the same characteristics. In case of a semiconductor sensor, a single sensor is installed in the AX side, a fixed resistor for compensation is installed in the AY side, fixed resistors are installed in the XB side and the YB side, respectively, a voltmeter V is installed between A and B, a balance regulation variable resistor regarding B is installed between X and Y, a power source is connected to Y, a switch for switching on and off the corresponding power is installed, and a bridge voltage regulation variable resistor is installed between the switch and X and connected therebetween.

When the foregoing gas sensor is a combustion type gas sensor, the sensor may be conjured by forming a platinum (Pt) line for heating an element which has a spring shape with a diameter ranging from 0.25 mm to 0.4 mm and a thickness ranging from about 0.03 mm to 0.05 mm within an alumina carrier detection device which has a surface treated with a palladium (Pd) or platinum (Pt) catalyst, has a resistance value ranging from 1.3 ohm to 2.3 ohm, and has a length ranging from 0.8 mm to 1.8 mm Here, in order for the combustion type gas sensor to be less affected by a harmful gas such as steam, temperature, humidity, carbon dioxide ($CO_2$), or carbon monoxide (CO) in a steel mill, the combustion type gas sensor may sense a harmful gas by converting heat of reaction between a combustible gas and oxygen into an electrical signal.

In transmitting the harmful gas sensing information in step S307, the reader devices 120-1 to 120-M may sense a harmful gas through the gas sensor provided therein, generate harmful gas sensing information (including reader device identification information thereof), and transmit the generated harmful gas sensing information to the intelligent integrated safety management control server 140 through the network 140 in real time.

When the harmful gas sensing information is transmitted in step S307, the intelligent integrated safety management control server 140 may receive harmful gas sensing information transmitted from the reader devices 120-1 to 120-M through the network 160 in real time, check reader device identification information from the received harmful gas sensing information, read installation location information corresponding to the checked reader device identification information from the database 150 and register the read installation location information as a harmful gas generation area in the database 150.

After the harmful gas generation area is registered in step S307, the intelligent integrated safety management control server 140 may determine whether the harmful gas generation area is on a predicted movement path of a worker, check reader devices 120-1 to 120-M corresponding to the current location of the worker from the database 150, generate a risk notification signal for directly informing the worker about a dangerous situation, and transmit the generated risk notification signal to the checked corresponding reader devices 120-1 to 120-M. Also, the intelligent integrated safety management control server 140 may establish dangerous situation recognition middleware, compare data collected from within a factory with peripheral data or data stored in the database 150 and analyze the data, analyze a state, or the like, through interaction between the components, and takes prompt measures such as transmission of a risk notification signal.

When the risk notification signal is transmitted in step S307, the reader devices 120-1 to 120-M receive the risk notification signal transmitted from the intelligent integrated safety management control server 140, and inform the worker about the dangerous situation through the alarm warning device unit in advance in step S308.

In step S308, the reader devices 120-1 to 120-M may transmit the risk notification information received from the intelligent integrated safety management control server 140 to the integrated tag devices 110-1 to 110-N connected for communication. The integrated tag devices 110-1 to 110-N may receive the risk notification signal transmitted from the reader devices 120-1 to 120-M and inform the worker about the dangerous situation through the alarm warning device unit in advance.

In order to allow for hazard search through augmented reality (AR), the intelligent integrated safety management control server 140 may store factory facility map information (i.e., 3D stereoscopic factory facility map information) corresponding to each reader device identification information in the database 150, map risk point information such as disaster generation information such as harmful gas generation information, or the like, to the corresponding factory facility map information and store the factory facility map information in the database 150. Thereafter, when the worker terminals 130-1 to 130-L, terminals used by workers (for example, mobile communication terminals such as a smartphone, a cellular phone, a PDA, a tablet PC, or a notebook computer), access the intelligent integrated safety management control server 140 through the network 160 and a worker inputs a map information request through an input unit such as a keypad, a touchscreen, or a mouse, the worker terminals 130-1 to 130-L check the input map information request, generate a map information request signal for requesting factory facility map information, check location information thereof (e.g., work terminal location information obtained through a GPS or a wireless base station), include the checked worker terminal location information and worker terminal identification information in the generated map information request signal, and subsequently transmit the map information request signal to the intelligent integrated safety management control server 140.

In transmitting the map information request signal as described above, the worker terminals 130-1 to 130-L may drive an on-site management application (or an on-site management program) installed therein according to a request from the worker through an input unit and access the intelligent integrated safety management control server 140 through the network 160.

In transmitting the map information request signal as described above, the worker terminals 130-1 to 130-L may access the reader devices 120-1 to 120-M through the on-site management application, and thereafter, when a worker inputs map information request through an input unit, the worker terminals 130-1 to 130-L may check the map information request, generate a map information request signal, include worker terminal identification information thereof in the generated map information request signal, and transmit the map information request signal to the reader devices 120-1 to 120-M. Then, the reader devices 120-1 to 120-M may receive the map information request signal transmitted from the worker terminals 130-1 to 130-L, include reader device identification information thereof in the received map information request signal, and transmit the map information request signal to the intelligent integrated safety management control server 140.

When the map information request signal is transmitted, the intelligent integrated safety management control server 140 may receive the map information request signal transmitted from the worker terminals 130-1 to 130-L through the network 160 in real time, check worker terminal location information and worker terminal identification information from the received map information request signal, check installation location information corresponding to the checked worker terminal location information and reader device identification information corresponding thereto from the database 150, read factory facility map information (i.e., 3D stereoscopic factory facility map information) corresponding to the checked reader device identification information from the database 150, and transmit the read factory facility map information (including disaster generation information and risk point information) to the worker terminals 130-1 to 130-L through the network 160.

In transmitting the map information request signal as described above, the intelligent integrated safety management control server 140 may receive map information request signal transmitted from the reader devices 120-1 to 120-M through the network 160 in real time, check reader device identification information from the received map information request signal, read factory facility map information (i.e., 3D stereoscopic factory facility map information) corresponding to the checked reader device identification information from the database 150, and transmit the read factory facility map information (including disaster generation information and risk point information) to the reader devices 120-1 to 120-M through the network 160. Here, the intelligent integrated safety management control server 140 may receive a map information request signal transmitted from the reader devices 120-1 to 120-M through the network 160, compare reader device identification information (e.g., Mac address) of the reader devices 120-1 to 120-M corresponding to a place where strength of the received map information request signal is the strongest with reader device identification information previously stored in the database 150 to determine whether the both are identical, read factory facility map information (i.e., 3D stereoscopic factory facility map information) corresponding to the checked reader device identification information from the database 150, and transmit the read factory facility map information to the reader devices 120-1 to 120-M. Thus, the reader devices 120-1 to 120-M may receive the factory facility map information transmitted from the intelligent integrated safety management control server 140 and transmit the received factory facility map information to the worker terminals 130-1 to 130-L.

When the factory facility map information as described above is transmitted, the worker terminals 130-1 to 130-L may receive the factory facility map information transmitted from the intelligent integrated safety management control server 140, and display a factory facility map to which disaster generation information and risk point information are mapped, through a display unit such as an LCD or a touchscreen.

In displaying the factory facility map as described above, the worker terminals 130-1 to 130-L may receive the factory facility map information transmitted from the reader devices 120-1 to 120-M and display a factory facility map to which disaster generation information and risk point information are mapped through a display unit.

As illustrated in FIG. 7, the worker terminals 130-1 to 130-L may perform RTLS middleware interworking and augmented virtuality (AV)-based dangerous substance or article searching through an on-site management application (e.g., an AV-based dangerous substance search application), i.e., dangerous area augmented reality (AR)-based software for workers. The worker terminals 130-1 to 130-L may receive factory facility map information from the intelligent integrated safety management control server 140 and display a risk point and disaster generation information of each factory facility through a display unit, information regarding whether a worker approaches a risky factor or leakage of a harmful gas is provided, details thereof are checked according to a request from a worker, and when an on-site risky factor is discovered, it is immediately registered to the intelligent integrated safety management control server 140 and sharing thereof is requested, thereby performing real-time safety management.

The intelligent integrated safety management control server 140, in association with an ERP system through the network 160, may check a high-risk group worker (i.e., a safety management subject) by utilizing a worker duty database through the ERP system, check a stored ill-health condition worker (i.e., safety management subject) by utilizing a health history management database including a physical condition through the EPR system, or the like, of a worker through the ERP, check a movement path of the checked safety management subject from the database 150, and monitor the safety management subject through a camera device (not shown for the purposes of description) installed in the checked movement path in real time. Here, the camera device may capture an image of the safety management subject in real time according to controlling of monitoring of the intelligent integrated safety management control server 140, and transmit the captured image to the intelligent integrated safety management control server 140 through the network 160. Then, the intelligent integrated safety management control server 140 may analyze the captured image transmitted from the camera device. Here, if a rapid change (e.g., a value greater than a change value of pre-set motion detect) in the monitoring image such as occurrence of an accident of the safety management subject or such as sudden collapse of the safety management subject is sensed, the intelligent integrated safety management control server 140 informs an operator or a manager about that, thereby performing intensive safety management on the high-risk group worker or the ill-health condition worker.

As illustrated in FIG. 8, the intelligent integrated safety management control server 140 establishes worker safety, entry, monitoring management software and provides control history, event history, alarm history, an entry report, and an entry analysis report in association with the ERP system through the network 160.

According to the present invention, by providing the intelligent integrated safety management control system, server, and method based on an RFID and USN capable of intelligently and integrated (or collectively) controlling safety management of workers in a steel mill, a workplace (factory) safety accident may be predicted and prevented in advance in an area involving many risky factors such as a risky industry (e.g., the steel industry, or the like), a workplace (factory) safety accident may be promptly coped with, cost for a system establishment may be minimized to establish a safe workplace environment, and an object and a person that moves in a wide area without a limitation of time, places, and distances, may be tracked precisely for a long period of time in indoor and outdoor areas.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An intelligent integrated safety management control system comprising:
a plurality of integrated tag devices configured to each include an active tag attached to a moving entity and transmit a tag signal;
a plurality of reader devices configured to recognize tag device identification information from a tag signal received from each tag device when connected to each tag device, to generate a tag device recognition signal including the recognized tag device identification information and transmit the tag device recognition signal, to receive a risk notification signal and inform a worker about a dangerous situation through an alarm warning device unit;
a plurality of worker terminals configured to check location information thereof according to a map information request from a worker through an input unit, include the checked location information in a map information request signal, and transmit the map information request signal, and to receive factory facility map information and display a factory facility map to which disaster generation information and risk point information are mapped, through a display unit; and
an intelligent integrated safety management control server configured to check reader device identification information and tag device identification information from the tag device recognition signal received from each reader device, to check installation location information corresponding to the checked reader device identification information and determine a location of a moving entity, to track a location of each moving entity by using the determined position information of the moving entity and analyze a movement pattern, to predict a movement path of the moving entity according to the analyzed movement pattern, to classify the analyzed movement pattern and the predicted movement path for each object or each worker and to store each classified movement pattern and predicted movement path according to the checked tag device identification information, to check reader device identification information corresponding to the current location of the object or the worker when the predicted movement path of the object and the predicted movement path of the worker are the same, to generate a risk notification signal and transmit the generated risk notification signal to a reader device corresponding to the checked reader device identification information, to check worker terminal location information and worker terminal identification information from the map information request signal received from the worker terminal, to check reader device identification information corresponding to the checked worker terminal location information, and to read factory facility map information corresponding to the checked reader device identification information and transmit the read factory facility map information to the worker terminal.

2. The intelligent integrated safety management control system of claim 1, wherein each of the plurality of reader devices includes reader device identification information thereof in a map information request signal received from a corresponding worker terminal and transmit the map information request signal to the intelligent integrated safety management control server, and thereafter, each of the plurality of reader devices factory facility map information received from the intelligent integrated safety management control server to a corresponding worker terminal.

3. The intelligent integrated safety management control system of claim 1, wherein each of the worker terminals drives an on-site management application according to a request from a worker through an input unit to access a corresponding reader device, generates a map information request signal including worker terminal identification information thereof, transmits the generated map information request signal to the corresponding reader device, and subsequently display factory facility map information received from the corresponding reader device through the display unit.

4. The intelligent integrated safety management control system of claim 1, wherein the intelligent integrated safety management control server stores factory facility map information corresponding to each reader device identification information in a database, maps disaster generation information and risk point information to the factory facility map information, and stores the factory facility map information in the database.

5. The intelligent integrated safety management control system of claim 4, wherein the intelligent integrated safety management control server checks reader device identification information from the map information request signal received from the corresponding reader device, reads factory facility map information corresponding to the checked reader device identification information from the database, and transmits the factory facility map information to the reader device.

6. The intelligent integrated safety management control system of claim 1, wherein the intelligent integrated safety management control server comprising:
an interface unit configured to transfer a tag device recognition signal or disaster generation information received from a reader device, receive predicted movement path information or disaster generation area, and subsequently register the received movement path information or disaster generation area in a database, to receive a risk notification signal and transmit the received risk notification signal to the reader device, and to transfer a map information request signal received from a worker terminal, receive factory facility map information, and subsequently transmit the received factory facility map information to the worker terminal;
a location tracking unit configured to check reader device identification information and tag device identification information from the tag device recognition signal transferred from the interface unit, to check installation location information corresponding to the checked reader device identification information and determine a location of a moving entity, and to perform location tracking on each moving object using the determined location
information of the moving entity and analyze a movement pattern; a movement path predicting unit configured to predict a movement path of a moving entity according to the movement pattern analyzed by the location tracking unit, and to classify the movement pattern analyzed by the location tracking unit and the predicted movement path according to objects or workers and register the classified movement pattern
and movement path according to the checked tag device identification information through the interface unit; a risk notification unit configured to, when the predicted movement path of an object registered in the database and the predicted movement path of the worker are the same, check reader device identification information corresponding to the current location of the object or
the worker, and to generate a risk notification signal and transmit the generated risk notification signal to a reader device corresponding to the checked reader device identification information through the interface unit; a disaster generation checking unit configured to check reader device identification information from disaster generation information transferred from the interface unit, and to
check installation location information corresponding to the checked reader device identification information, and to register the installation location information as a disaster generation area through the interface unit; and a map information providing unit configured to check worker terminal location information and worker terminal identification from a map information request signal
transferred from the interface unit, to check reader device identification information corresponding to the checked worker terminal location information, read factory facility map information corresponding to the checked reader device identification information and transfer the read factory facility map information to the interface unit.

7. The intelligent integrated safety management control system of claim 6, wherein the intelligent integrated safety management control server further comprising: a safety management monitoring unit configured to check a preset safety management subject by utilizing a worker duty database in association with an enterprise resource planning (ERP) system through a network, check a movement path of the checked safety management subject from the database, monitor the safety management subject through a camera device installed in the checked movement path, analyze a monitoring image through the camera device, and inform an operator or a manager when a value equal to or greater than a preset motion detect change value is sensed.

8. An intelligent integrated safety management control method comprising:
recognizing, by a reader device, tag device identification information upon receiving a tag signal from an integrated tag device when the reader device is connected to the integrated tag device for communication, generating a tag device recognition signal including the recognized tag device identification information, and transmitting the generated tag device recognition signal;
receiving, by an intelligent integrated safety management control server, the tag device recognition signal, checking reader device identification information and the tag device identification information, checking installation location information corresponding to the checked reader device identification information to determine a location of a moving entity, and tracking a location of each moving entity by using the determined location information of the moving device to analyze a movement pattern;
predicting, by the intelligent integrated safety management control server, a movement path of the moving entity according to the analyzed movement pattern, and classifying the analyzed movement pattern and the predicted movement path according to objects or workers, and storing the classified movement pattern and movement path according to checked tag device identification information;
when the predicted movement path of an object and the predicted movement path of a worker are the same, checking, by the intelligent integrated safety management control server, reader device identification information corresponding to the current location of the object or the worker, generating a risk notification signal, and transmitting the generated risk notification signal to a reader device corresponding to the reader device identification information;
receiving, by the reader device, the risk notification signal, and informing the worker about a dangerous situation through an alarm warning device unit;

checking, by a worker terminal, location information thereof according to a map information request from a worker through an input unit, including the checked location information in a map information request signal, and transmitting the map information request signal;

receiving, by the intelligent integrated safety management control server, the map information request signal, checking worker terminal location information and worker terminal identification information, checking reader device identification information corresponding to the checked worker terminal location information, reading factory facility map information corresponding to the checked reader device identification information, and transmitting the read factory facility map information; and receiving, by the worker terminal, the factory facility map information, and displaying a factory facility map to which disaster generation information and risk point information are mapped through a display unit.

9. The intelligent integrated safety management control method of claim 8, wherein the analyzing of a movement pattern comprises: setting a compensation value for compensating for the difference in locations by comparing the determined location information of the moving entity with an actual location of the moving entity, in advance through experiment, testing, and measurement, performing compensation on the determined location information of the moving entity with the preset compensation value, and determining a location of the moving entity.

10. The intelligent integrated safety management control method of claim 8, wherein the analyzing of a movement pattern comprises:

receiving the tag device recognition signal, and comparing reader device identification information of reader devices corresponding to three places in which strength of the received tag device recognition signal is strongest with reader device identification information stored in the database;

estimating a distance to a moving entity by connecting a path loss of the tag device recognition signal between the integrated tag device and the reader device to a distance by which the tag device recognition signal has moved by utilizing the Friis calculation scheme;

calculating a location of the moving entity by using triangulation with respect to the estimated distances to the moving entity;

removing noise by applying the Kalman Filter technique to the calculated location of the moving entity; and tracking a location of the moving entity by X and Y coordinate calculation with respect to the noise-removed location of the moving entity.

* * * * *